United States Patent [19]

Eick

[11] Patent Number: 5,611,257
[45] Date of Patent: Mar. 18, 1997

[54] PNEUMATIC BRAKE BOOSTER AND PROCESS FOR MANUFACTURING SAME

[75] Inventor: Rüdiger Eick, Pfaffenheck, Germany

[73] Assignee: Lucas Industries Public Limited Company, United Kingdom

[21] Appl. No.: 476,733

[22] Filed: Jun. 7, 1995

[30] Foreign Application Priority Data

Jun. 23, 1994 [DE] Germany .......................... 44 22 027.8

[51] Int. Cl.⁶ ............................ B60T 13/57; B23P 13/00
[52] U.S. Cl. ............................................. 91/367; 91/376 R
[58] Field of Search ................................. 91/367, 376 R, 91/369.1, 369.2, 368

[56] References Cited

U.S. PATENT DOCUMENTS

| 5,172,964 | 12/1992 | Levrai et al. | 91/376 R X |
| 5,437,217 | 8/1995 | Castel et al. | 91/376 R X |
| 5,483,866 | 1/1996 | Schluter | 91/376 R X |

FOREIGN PATENT DOCUMENTS

| 2415683 | 10/1974 | Germany . |
| 4238333A1 | 5/1994 | Germany . |

*Primary Examiner*—John E. Ryznic
*Attorney, Agent, or Firm*—Wood, Herron & Evans, P.L.L.

[57] ABSTRACT

A pneumatic brake booster with a booster housing part includes a vacuum chamber and a working chamber separated therefrom by a movable wall, and a valve body part including a control valve assembly and an electromagnet assembly. The control valve assembly can be actuated both by an actuation rod as well as by the electromagnet assembly, in order to make connections between the vacuum chamber and the working chamber, or between the working chamber and the ambient atmosphere. To improve the heat dissipation and to simplify the assembly the valve body part comprises several separate portions at least the first portion of the valve body part being at least partially designed as a magnetic return of the electromagnet assembly and is coupled with the second portion of the valve body part.

19 Claims, 1 Drawing Sheet

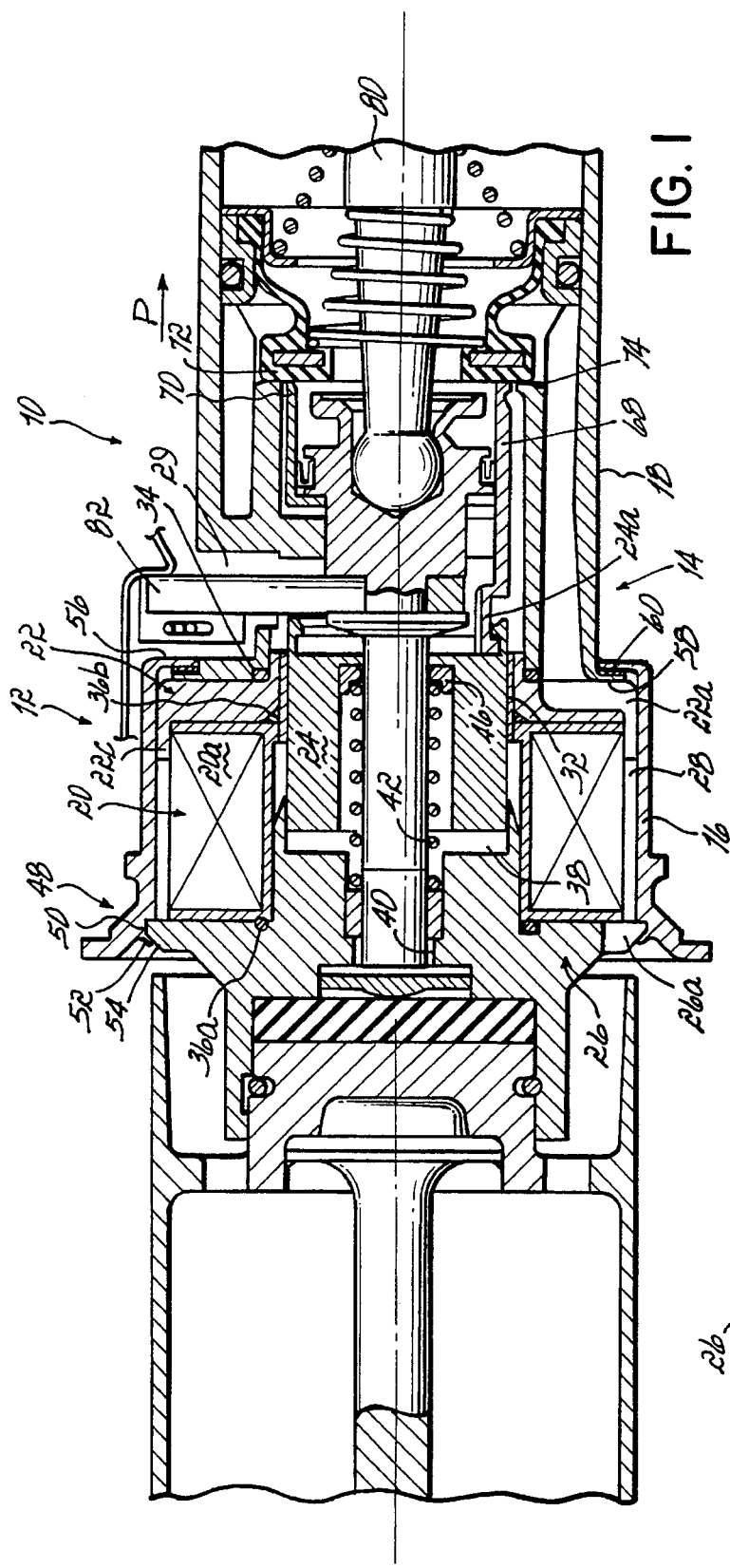
FIG. 1
FIG. 2
FIG. 3 ns that they can be slided one into the other, with the
PNEUMATIC BRAKE BOOSTER AND PROCESS FOR MANUFACTURING SAME

BACKGROUND OF THE INVENTION

The present invention relates to a pneumatic brake booster, as disclosed in DE 24 15 683.

A similar arrangement is known, for example, from DE 42 383 333 A1.

The drawback of this arrangement is the expensive assembly due to the plurality of components. Moreover, the insertion and positioning of the individual components into the elongated booster housing part can be accomplished only by means of special tooling. Another disadvantage is the relatively unfavourable heat dissipation of the power loss from the electromagnet assembly, which therefore has to be so dimensioned that it is larger than required by the actuation forces of the control valve assembly. Finally, this construction affects the fatigue strength of the arrangement.

SUMMARY OF THE INVENTION

The invention is therefore based on the object to improve the initially mentioned pneumatic brake booster in such a manner that it can be manufactured more economically and that its operating properties are improved.

It is thereby achieved that a single component, i.e. a first portion of the valve body part performs at least two functions: to be the cover of the control valve assembly and part of the electromagnet assembly. The cover ensures the mechanical strength of the construction. By dividing the valve body into at least two portions, individual components can be (pre-)assembled more easily in the respective portion and then be joined with the components in the other portion. Since the separate magnetic flux return which has previously been required in the state of the art, can now be omitted because it is integrated into the housing, the electromagnet assembly can be built larger, with the total cross sectional area remaining the same, which means a lower power density.

A further integration of functions into one component can involve that the first portion of a valve body part has at least one seat for accommodating parts of the booster (e.g. a wall of the booster housing, a movable wall between the working chamber and the vacuum chamber, seals).

The first portion of the valve body part is preferably made from soft iron, which has both good magnetic properties as well as a satisfactory heat conductivity. Other materials with similar or even better properties can also be advantageously be used.

To ensure the functioning of the brake booster, it is advantageous to connect the first and second portion of the valve body part in a positively engaging and/or air tight manner. The first portion of the valve body part can be coupled with the second portion by casting or injection moulding plastic around the edge of the first portion.

The first portion of the valve body part preferably houses a solenoid assembly and an armature of the electromagnet assembly.

In order to enable a compact construction of the brake booster and a good heat dissipation to the outside, it is advantageous to design the electromagnet assembly as a pot magnet with an axially movable armature. An alternative would be a rotary magnet assembly which effects an actuation of the control valve via a lever or threaded arrangement, if necessary.

In a preferred embodiment of the brake booster according to the invention, the solenoid assembly is provided with an armature counterpart at its first axial end and with a magnetic flux conducting shaped part at its other axial end, with the solenoid assembly, the armature counterpart and the magnetic flux conducting shaped part defining an armature space wherein the armature can move. The armature counterpart can also project into the armature space defined within the solenoid assembly. In order to achieve pressure conditions as closely defined as possible and to avoid pneumatic bypassing through the electromagnet assembly, it is advantageous to design the solenoid assembly, the armature counterpart and the magnetic flux conducting shaped part in such a manner that they envelop the armature space in an air tight manner.

For the purpose of weight saving and because of the reduced manufacturing expenditures, in particular, it is advantageous to form the second portion of the valve body part from a plastic material.

A particularly preferred embodiment of a coupling between the first and second portion of the valve body part is obtained in that the first and second portion each are provided with a collar angled inwardly or outwardly, respectively, at their ends facing each other, with the inwardly and the outwardly angled collars engaging each other. Thus the two portions can simply slided one into the other until the two collars are in an abutting relationship.

Another assignment of a function to the first and/or the second portion of the valve body part can be achieved by arranging therein at least one duct for the connections between the vacuum chamber and the working chamber, or between the working chamber and the ambient atmosphere.

In order to achieve the maximum possible compact construction, several functions can also be integrated in the armature counterpart or the magnetic flux conducting shaped part. Those parts can, for example, be provided with at least one recess which forms at least part of the duct.

In this case, each recess is preferably defined by areas which conduct the magnetix flux. The areas contacting the inner wall of the first portion of the control valve body are so dimensioned that the magnetic flux is not limited. On the other hand, the recesses are so dimensioned that a sufficient cross sectional area of the duct is available for the connection(s).

For the manufacture of a pneumatic brake booster such as that of the above described type, the following process can advantageously be employed: Providing a first portion of a valve body part, providing a second portion of a valve body part, forming a first coupling element at the first portion, forming a second coupling element at the second portion, which is adapted to cooperate with the first coupling element, and connecting the first portion of the valve body part with the second portion of the valve body part. In this way, the assembly can be considerably simplified, because it is possible to preassemble individual assemblies in the respective body portion.

For the purpose of achieving a coupling as simple as possible, it is preferred to form each of the first coupling element and the second coupling element so as to define an inwardly or outwardly, respectively, angled collar at one end of the first and second portion of the valve body part, and to design the first portion of the valve body part and the second portion of the valve body part with respect to their dimensions that they can be slided one into the other, with the inwardly angled collar and the outwardly angled collar engaging each other and forming a stop.

For the purpose of an air tight sealing of the arrangement, a seal is placed between the inwardly angled collar and the outwardly angled collar prior to sliding the first and second portion of the valve body part into each other.

The electromagnet assembly is formed in the first portion of the valve body part by inserting a magnetic flux conducting shaped part, an armature, a solenoid assembly and an armature counterpart.

In order to complete the magnetic circuit, the first portion of the valve body part is securely coupled with the armature counterpart and/or the magnetic flux conducting shaped part. This can be effected in a particularly simple and positively engaging manner, preferably by rolling or caulking.

In the following description an embodiment of a pneumatic brake booster according to the invention will be explained with reference to the drawing, from which further characteristics, advantages and possible modifications of the invention result. In the drawing:

BRIEF DESCRIPTION OF THE DRAWINGS

FIG. 1 shows an embodiment of a control valve for a pneumatic brake booster according to the invention in a partially sectioned schematic side view;

FIG. 2 shows a magnetic flux conducting shaped part for the control valve in FIG. 1 in a schematic plan view; and FIG. 3 shows an armature counterpart for the control valve in FIG. 1 in a schematic plan view.

DETAILED DESCRIPTION

FIG. 1 illustrates a control valve assembly 10 and an electromagnet assembly 12 of a pneumatic brake booster. The control valve assembly 10 and the electromagnet assembly 12 are housed in a valve body 14 which together with a booster housing part (not shown) contains a pneumatic brake booster. The valve body 14 is designed as a two-piece part. The electromagnet assembly 12 is located in a first portion 16 of the valve body part 14. This first portion 16 is coupled with a second portion 18 of the valve body part 14, which accommodates the control valve assembly 10.

The first portion 16 of the valve body part 14 is made from soft iron and forms a magnetic return for the electromagnet assembly 12. For this purpose, a solenoid assembly 20, a magnetic flux conducting shaped part 22, an armature 24 and an armature counterpart 26 are inserted into the first portion 16 of the valve body part 14. The magnetix flux conducting shaped part 22 and the armature counterpart 26 each are illustrated as plan views in FIGS. 2 and 3.

The shaped part 22 has an essentially circular plan view with recesses 22a, which represent parts of ducts 28, 29 for the connections between a vacuum chamber (not shown) and a working chamber (which is also not shown) of for connections from the working chamber (not shown) to the ambient atmosphere.

Each of the recesses 22a is bordered by areas 22b via which the shaped part 22 makes a magnetically conducting connection with the first portion 16 of the valve body part 14. The armature 24 is separately accommodated in a centre hole 30 in the shaped part 22 via a sliding layer 32.

The shaped part 22 is provided with an annular collar 22d at its inner diameter which projects into one direction (toward the second portion 18), and at its outer diameter with an annular collar 22d which projects into the other direction (toward the booster housing). The shaped part 22 is centered in the first portion 16 of the valve body part 14 via the outer annular collar 22d. The inner annular collar 22d ensures an extended guide of the armature 24 and a defined seat for a sealing ring 34.

The solenoid assembly 20 is formed by a solenoid body 20a and a solenoid winding 20b. The solenoid assembly 20 is sealed in an air tight manner against the armature counterpart 26 or the shaped part 22, respectively, at both inner ends of the solenoid body 20a by means of seals 36a and 36b. The armature counterpart 26 projects into the interior of the solenoid assembly 20 and forms a boundary from one side of an armature space 38 which accommodates the armature 24 in an axially movable manner.

At the end of the armature 24 which projects from the shaped part 22 there is provided a hook shaped extension 24a which cooperates with a part of the valve assembly 12 in order to achieve an actuation of the valve assembly 10 upon an axial displacement of the armature 24.

Similar to the shaped part 22, the armature counterpart 26 has an essentially circular cross section. In this case, too, recesses 26a serve as passages for connections from or to the individual chambers of the brake booster.

The recesses 22a and 26a of the shaped part 22 and the armature counterpart 26, respectively, and the areas 22b and 26b between the respective recesses 22a and 26a are so dimensioned that, one the one hand, there does neither occur a tapering of the flow cross sectional area of the ducts 18, 19 and, on the other hand, nor a limitation of the magnetic flux from the shaped part 22 or the armature counterpart 26, respectively, to the first portion 16 of the valve body 14.

The sealing ring 36a is accommodated in an annular groove 26b. A center hole 40 is designed as a stepped hole in order to support a helical spring 42 which forces the armature 24 via a ring 46 away from the armature counterpart 26.

The essentially hollow cylindrical portion 16 of the valve body part 14 is provided at its outer shell surface with a seat 48 for a movable wall, seals and/or parts of the walls of the booster housing part.

In the area of the seat 48, a step 50 is machined into the inner wall of the first portion 16 of the valve body part 14, into which the outer edge of the armature counterpart 26 is fitted. A projection 52 at the front end of the first portion 16 is pressed against a chamfered circumferential surface 54 at the armature counterpart 26 by means of a rolling or bordering process, so that a connection for conducting the magnetic flux is generated between the first portion 16 of the valve body part 14 and the armature counterpart 26.

At the opposite end of the first portion 16 of the valve body part 14 an inwardly projecting rectangularly angled collar 56 is formed.

A correspondingly formed outwardly projecting rectangularly angled collar 58 at the second portion 18 of the valve body part 14 is so designed that the second portion 16 can be passed therethrough in the direction of Arrow P and the two collars 56, 58 form a stop. The stop prevents a complete passage of the second portion 18 through the first portion 16. In order to achieve an air tight construction, a circumferential sealing ring 60 is placed between the first collar 56 and the second collar 58.

When assembling the valve body 14, the second portion 18 (as the case may be, with the already assembled control valve assembly 10) is inserted into the first portion 16 after placing the sealing ring 60, until the two collars 56, 58 abut.

Subsequently, the shaped part 22 with the sealing ring 34 is inserted into the first section 16. This is followed by the solenoid assembly 20 with the seal 36b and the armature counterpart 26, the helical spring 42 with the ring 44. Subsequently, the first portion 16 is firmly and in a positively engaging manner joined with the armature counterpart 26 by the rolling and bordering operation.

If an electric current is applied to the solenoid assembly 20, the magnetic force being built up tends to displace the armature 24 against the force of the helical spring 42. This movement is transferred to the sealing ring 60 being rigidly coupled with the armature 24, which causes said ring 60 to clear a valve seat 70, after a sealing element 72 has closed an annular sealing valve element 74 of the duct 28 to the vacuum chamber.

If the electric current to the solenoid assembly 20 is switched off, the armature 24 is returned into its initial position by the helical spring 42. The valve element 68 coupled with the armature 24 then moves toward the valve seat 70 and thus closes the connection of the working chamber to the ambient atmosphere.

Due to the fact that during the actuation the entire control valve body was moved toward the booster housing, the return travel is not limited by the stop of a bolt 82 attached to an actuation rod 80 at the booster housing. The control valve body can therefore drive the valve seat 70 over such a distance that it clears the valve element 74 and opens the connection from the vacuum chamber to the working chamber. This causes the pressure difference to disappear, and the control valve body is returned into its initial position.

I claim:

1. A pneumatic brake booster, comprising:

a booster housing part including a vacuum chamber and a working chamber separated therefrom by a movable wall, and a valve body part (14) including a control valve assembly (10) and an electromagnet assembly (12), wherein the control valve assembly (12) can be actuated both by an actuation rod (80) as well as by the electromagnet assembly (12), in order to make connections between the vacuum chamber and the working chamber, or between the working chamber and the ambient atmosphere, the valve body part (14) comprises several separate portions (16, 18), characterized in that at least the first portion (16) of the valve body part (14) is:
   coupled with the booster housing part,
   at least partially designed as a magnetic return of the electromagnet assembly (12), and
   coupled with the second portion (18) of the valve body part (14).

2. A pneumatic brake booster according to claim 1, characterized in that the first portion (16) of the valve body part (14) at its outer surface comprises at least one seat (48) for parts of the booster.

3. A pneumatic brake booster according to claim 1 or 2, characterized in that that first portion (16) of the valve body part (14) is made from soft iron.

4. A pneumatic brake booster according to claim 1 characterized in that the first portion (16) of the valve body part (14) and the second portion (18) of the valve body part (14) are coupled in at least one of the following manners, positively engaging and air tight.

5. A pneumatic brake booster according to claim 1, characterized in that:

the first portion (16) accommodates a solenoid assembly (20) and an armature (24) of the electromagnet assembly (12).

6. A pneumatic brake booster according to claim 1, characterized in that:

the electromagnet assembly (12) is designed as a pot magnet.

7. A pneumatic brake booster according to claim 6, characterized in that the solenoid assembly (20) comprises an armature counterpart (26) at its one axial end and a magnetic flux conducting shaped part (22) at its other axial end.

8. A pneumatic brake booster according to claim 7, characterized in that the solenoid assembly (20), the armature counterpart (26) and the magnetic flux conducting shaped part (22) define an armature space (38) in which the armature (24) is movably arranged.

9. A pneumatic brake booster according to claim 8, characterized in that:

the solenoid assembly (20), the armature counterpart (26) and the magnetic flux conducting shaped part (22) define an armature space (38) which surrounds the armature space (38) in an air tight manner.

10. A pneumatic brake booster according to claim 7, characterized in that:

at least one of the armature counterpart (26) and the magnetic flux conducting shaped part (22) comprises at least one recess (22a, 26a), which forms at least part of a duct (28).

11. A pneumatic brake booster according to claim 1, characterized in that:

the second portion (18) of the valve body part (14) is made from a plastic material.

12. A pneumatic brake booster according to claim 1, characterized in that:

the first and second portion (16, 18) of the valve body part (14) are provided each with a collar (56, 58), the collar 56 of the first portion 16 angled inwardly and the collar 58 of the second portion 18 angled outwardly, with the inwardly angled collar (56) and the outwardly angled collar (58) engaging each other.

13. A pneumatic brake booster according to claim 1, characterized in that:

in at least one of the first and the second portions (16, 18) of the valve body part (14) there is arranged at least one duct (28) for making one of the two following connections, between the vacuum chamber and the working chamber and between the working chamber and the ambient atmosphere.

14. A pneumatic brake booster according to claim 1, characterized in that:

each recess (22a, 26a) is limited by areas (22b) which are conductive for the magnetic flux.

15. A method for manufacturing a pneumatic brake booster, comprising the following steps:

providing a first portion of a valve body part, providing a second portion of a valve body part, forming a first coupling element at the first portion, forming a second coupling element at the second portion, which is adapted to cooperate with the first coupling element, and coupling the first portion of the valve body part with the second portion of the valve body part, characterized in that the first coupling element and the second coupling element are formed so as to define an inwardly or outwardly, respectively, angled collar at one end of the first and second portion of the valve body part, the first portion of the valve body part and the second portion of the valve body part are so designed with respect to their dimensions that they can be slided one into the other, with the inwardly angled collar and the outwardly angled collar engaging each other and forming a stop.

16. A method for manufacturing a pneumatic brake booster according to claim 15, characterized in that a seal is placed between the inwardly angled collar and the outwardly angled collar.

17. A method for manufacturing a pneumatic brake booster according to claim 16, characterized in that a magnetic flux conducting shaped part, an armature, a solenoid assembly and an armature counterpart are inserted into the first portion of the valve body part.

18. A method for manufacturing a pneumatic brake booster according to claim 17, characterized in that:

the first portion of the valve body part is securely connected with at least one of the armature counterpart and the magnetic flux conducting shaped part.

19. A method for manufacturing a pneumatic brake booster according to claim 18, characterized in that:

the secure connection of the first portion of the valve body part with at least one of the armature counterpart and the magnetic flux conducting shaped part is made in a positively engaging manner, by one of the two following methods; rolling and caulking.

* * * * *